Patented Aug. 15, 1939

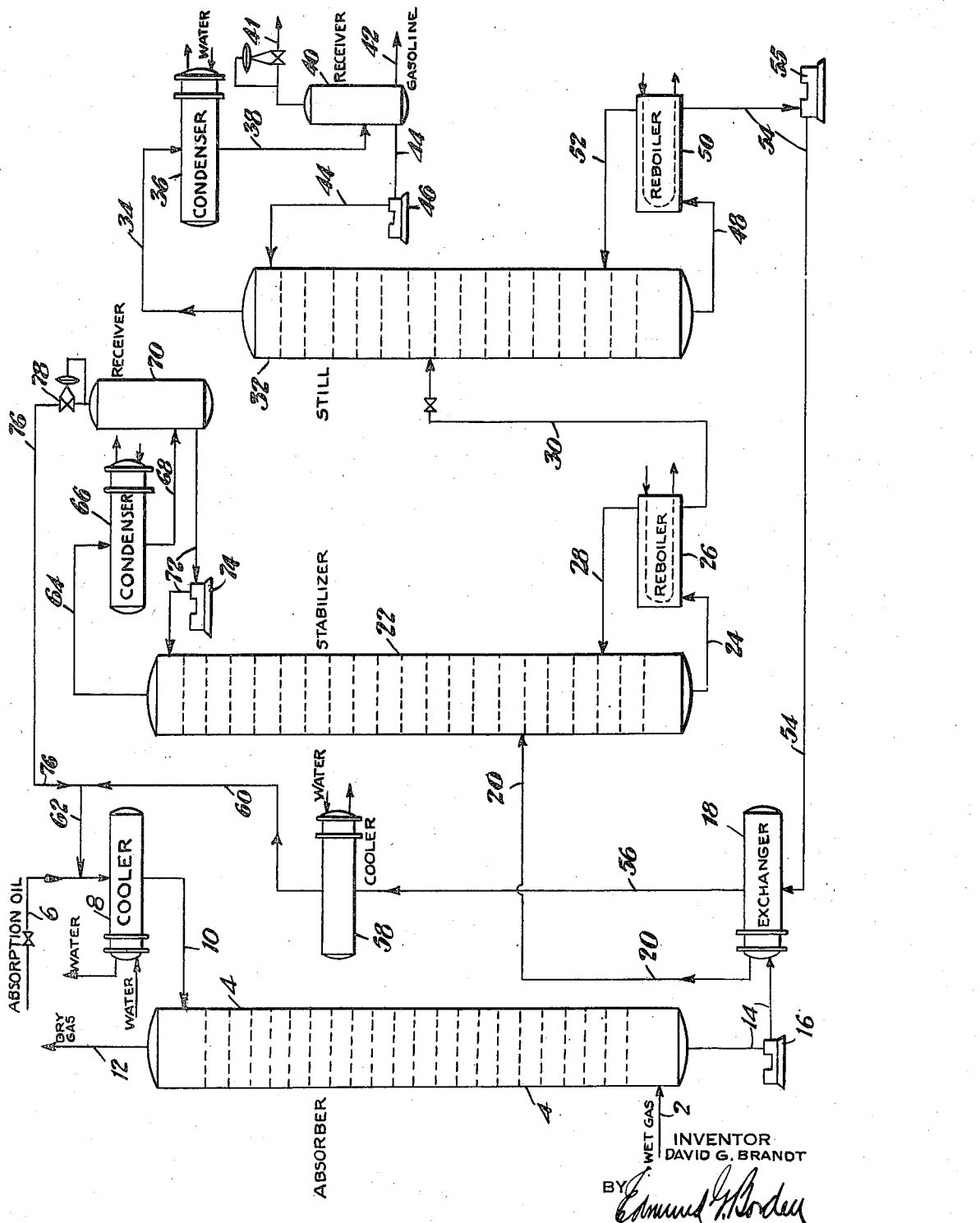

2,169,959

UNITED STATES PATENT OFFICE 2,169,959

RECOVERY OF GASOLINE HYDROCARBONS

David G. Brandt, Westfield, N. J., assignor to Power Patents Company, Hillside, N. J., a corporation of Maine Application June 7, 1938, Serial No. 212,219

8 Claims. (Cl. 196—8)

This invention relates to a process and apparatus for recovering hydrocarbons suitable for use in motor fuel compositions from mixtures of low molecular weight gases containing such hydrocarbons. More particularly, the invention relates to the recovering of hydrocarbons suitable for use in motor fuel compositions from hydrocarbon gases removed from oil cracking and conversion units, from the carbonization of coal and from natural gas mixtures.

The present application covers an improvement on the applicant's process for the absorption of valuable hydrocarbons in gases, as disclosed in Patent No. 2,074,978, granted March 23rd, 1937. Certain of the features disclosed in this patent and not claimed therein, are disclosed and claimed in this application. This patent discloses an absorption operation in which a portion of the light hydrocarbons contained in the rich absorption oil removed from an absorber are vaporized in a fractionating tower. These vaporized light hydrocarbons are removed overhead from the tower and mixed with a higher boiling liquid hydrocarbon material which is utilized to absorb the light hydrocarbon vapors. The mixture is conducted through a cooling coil in a condenser to aid in the absorption.

The primary object of the present invention is to provide an improved process and apparatus for recovering valuable hydrocarbons suitable for use in motor fuel compositions from gaseous mixtures containing such hydrocarbons.

The process of the present invention comprises an improvement in the absorption of desirable hydrocarbons from gaseous mixtures by passing such mixtures countercurrent to an absorption medium passed through an absorption tower. One of the important features of the improvement on this operation is the recovery of the used absorption medium, contacting the same with the lighter gases removed from the absorption medium and utilizing the resulting mixture as the absorption medium for a subsequent countercurrent contact in the absorption tower.

Additional features and objects of the improved process of the present invention will be apparent to those skilled in the art from the following more detailed description thereof, taken in connection with the attached drawing in which:

The single figure is a flow diagram of an apparatus representing suitable equipment particularly adapted for carrying out the improved process.

The gases containing the desirable hydrocarbons to be recovered in accordance with the features of the present invention which are preferably so-called "wet" gases, are passed through a line 2 and introduced into the lower portion of an absorption tower 4. The original absorption medium for use in the process which preferably comprises a suitable hydrocarbon oil, is passed into the system of the apparatus shown in the drawing through a valved line 6, cooled to a predetermined low temperature by indirect heat exchange with water in a cooler 8, and then passed through a line 10 into the upper portion of the absorption tower 4. The absorption oil passes downwardly through the absorber 4 countercurrent to the gas introduced through the line 2, and absorbs certain of the hydrocarbons from the gas, leaving a relatively "dry" gas which is discharged from the absorber through a line 12.

The rich absorption oil is withdrawn from the absorber 4 through a line 14 by means of a pump 16 mounted therein, and passed through a heat exchanger 18 in which it is heated to a temperature adapted to vaporize certain of the absorbed constituents. The heated absorption oil is conducted from the exchanger 18 through a line 20 into the mid-portion of a stabilizer 22. The hydrocarbons introduced into this stabilizer tower are preferably fractionated or stabilized, so as to remove overhead all low boiling hydrocarbons not desired in the final product. This may include propane and lower boiling hydrocarbons as well as a portion of the butane content, sufficient butane being retained in the liquid product removed from the bottom of the stabilizer to provide a final motor fuel product of desired vapor pressure. Accordingly, the fractionation is conducted in such a way as to achieve these objects. The absorption medium containing the desired hydrocarbons is removed from the stabilizer 22 through a line 24 into a reboiler 26 where the product is heated to a temperature sufficient to vaporize some of the light components which pass through a vapor line 28, back into the lower portion of the tower 22, to provide the heat necessary for maintaining the temperature gradient in the tower. The stabilization in the tower 22 is preferably carried out at a high pressure of from 175 to 400 lbs. per square inch.

The absorption oil containing only the desired products free of low boiling hydrocarbons is conducted from the reboiler 26 through a valved line 30 into a tower still 32 which is preferably operated at low pressure for the separation of the absorbed hydrocarbons from the absorption medium. The absorbed hydrocarbons introduced into the still 32 will substantially all vaporize because of the reduction in pressure in the line 30. The resulting vapors are conducted from the still 32 through a vapor line 34 condensed in a condenser 36, and the resulting products conducted through a line 38 into a receiver 40 where any uncondensed gases are permitted to separate from the condensate. Uncondensed gases are discharged thru a pressure valve controlled line 41. The condensate may comprise a stabilized gasoline or motor fuel which is discharged from the receiver 40 to storage or use through a line 42. A portion of the condensate collected in the receiver 40 is preferably used as a refluxing medium in the tower still 32 by passing such condensate through a line 44 in which is mounted a pump 46. The pump may be automatically operated if desired, to provide the proper reflux ratio in the tower still 32.

The absorption oil reaching the bottom of the still 32 is withdrawn through a line 48 into a reboiler 50 where a portion of the oil is vaporized and the vapors returned to the still 32 through a line 52, in order to maintain the desired bottom temperature in the still. The reboilers 26 and 50 may be heated by any suitable heating medium such as a hot oil product or superheated steam. The hot lean absorption medium in the reboiler 50 is withdrawn through a line 54, in which is mounted a pump 55, and forced under pressure through the heat exchanger 18, where it is cooled by heat exchange with the rich absorption oil from the tower 4. The partially cooled lean absorption oil is conducted from the heat exchanger 18 through a line 56, a water cooler 58 and lines 60 and 62, into the line 6, for its return to the absorber 4.

In accordance with an important feature of the present invention, the hydrocarbon constituents removed from the mixture stabilized in the stabilizer 22, are withdrawn as vapors through a vapor line 64, partially condensed in a condenser 66, and the resulting condensate and vapor passed through a line 68 into a receiver 70 where uncondensed vapors and gases are permitted to separate from the condensate. The condensate collected in the receiver 70 is passed through a line 72 by means of a pump 74 mounted therein, into the upper part of the stabilizer 22 as a refluxing medium. Under particular instance, this condensate may be comprised mainly of butane with certain minor proportions of propane and pentane, and unsaturated hydrocarbons boiling in the same temperature range. The degree of condensation in the condenser 66 is preferably controlled so as to merely provide sufficient condensate to maintain the proper reflux ratio for the tower 22. This control may be made automatic by the use of well-known equipment.

The vapors separated in the receiver 70 are removed through a line 76, provided with an automatic pressure controlled valve 78, and passed into the line 62 where they are intimately mingled with the cool lean absorption medium from the line 60. The resulting mixture is conducted through a portion of the line 6, cooler 8, and the line 10, into the upper portion of the absorber 4. The lean absorption oil completely takes up the light hydrocarbon vapors from the line 76 in the line 62 and cooler 8, so that an absorption medium is provided which contains a substantial proportion of light hydrocarbon constituents not desired in the stabilized gasoline product.

Where a heavy hydrocarbon oil such as mineral seal oil is used as an absorption medium for gases of the type referred to, the absorption step itself produces a relatively large amount of heat, so that it is practically impossible to efficiently utilize such an absorption medium without providing an absorber with considerable cooling surface. Even when the absorption oil is precooled before being introduced into the absorber, it is heated to an ineffective absorption temperature, unless cooling in the absorber is resorted to.

After considerable work on this problem, it has been found that much less heat is produced if a low boiling point absorption medium is provided. The vapors and gases absorbed into the higher boiling oil in the line 62 and cooler 8 preferably comprise a very substantial proportion of the absorption medium for the absorber 4, and the cooling in the cooler 8 is preferably sufficient to provide effective absorption in the tower 4 without the necessity of providing any cooling surface in this tower. A portion of the heat loss usually encountered in absorption operations is undoubtedly avoided in the present improved process, because of the presence of the low boiling constituents in the absorption oil and because of the exchange of some of the low boiling constituents in the absorption medium for higher boiling hydrocarbons contained in the "wet" gases introduced into the tower 4.

The absorption oil for the process is preferably a low boiling stock which may contain some constituents boiling within the range of the gasoline or motor fuel product recovered overhead from the tower still 32. In any case, the absorption medium introduced through the line 10 preferably contains a very substantial proportion of low boiling constituents.

The absorber 4 may be effectively operated at a pressure not substantially above atmospheric, because of the fact that the desired hydrocarbons are readily absorbed in the absorption medium containing the low boiling constituents. The use of a low pressure in the absorber 4 will avoid the necessity of compressing gases to the high pressures used in some absorption systems where heavy oil of the type of mineral seal oil is employed. Various modifications of the process and apparatus may be used within the scope of the present invention, which is defined by the appended claims.

Having thus described the invention in its preferred form, what is claimed as new is:

1. In a process for recovering valuable hydrocarbons from gases containing such hydrocarbons in which the gases are passed through an absorption tower in intimate countercurrent contact with an absorption medium, the improvement which comprises passing the resulting rich absorption medium containing the desired hydrocarbons and some lower boiling undesired hydrocarbons from the absorption tower into a stabilizer, removing all of the undesired low boiling hydrocarbons from the upper part of the stabilizer in vapor form and subjecting them to the absorbing action of an absorption oil while passing the removed hydrocarbon vapors and oil in contact through a cooling zone, and thereafter introducing the resulting cooled mixture of absorption oil and absorbed lower boiling hydrocarbons into the said absorption tower as the absorption medium for recovering the desired hydrocarbons from the gases introduced thereinto.

2. The process of recovering valuable hydrocarbons as defined by claim 1 in which the absorption medium, together with the desired hydrocarbons are removed from said stabilizer and separated to recover said absorption medium free of said hydrocarbons and utilizing said absorption medium as the oil for absorbing said low boiling point hydrocarbon vapors removed from said stabilizer.

3. The process for recovering valuable hydrocarbons from gases as defined by claim 1 in which the absorption medium is removed from said stabilizer and recovered free of the absorbed hydrocarbons, passing said recovered absorption medium while hot in indirect heat exchange with the rich absorption medium removed from the said absorption tower and then utilizing the recovered absorption medium as the oil for absorbing the low boiling hydrocarbon vapors removed from said stabilizer.

4. In the process of recovering gasoline constituents from a gaseous hydrocarbon mixture containing such constituents as well as substantial proportions of lower boiling point hydrocarbons by absorbing the gasoline hydrocarbons in a cool liquid absorbing medium from which the absorbed gasoline constituents are recovered by distillation, the improvement which comprises passing the resulting rich absorption medium from the absorption operation into a stabilizing tower and therein rectifying the absorbed constituents to remove overhead the undesired lower boiling point hydrocarbons in vapor form, absorbing the removed vapors into a hydrocarbon absorption oil, and thereafter utilizing the resulting mixture as the absorbing medium in the said absorption operation for absorbing additional quantities of gasoline hydrocarbons.

5. The process for recovering gasoline constituents as defined by claim 4 in which the absorbing medium together with the desired gasoline hydrocarbons, are removed from said stabilizing tower and separated, and utilizing the separated absorbing medium as the hydrocarbon oil for absorbing the lower boiling hydrocarbon vapors removed overhead from the stabilizing tower.

6. The process as defined by claim 4 in which the vapors removed overhead from the stabilizing tower are cooled to produce a condensate which is returned to the top of the tower as a refluxing medium to maintain a desired reflux ratio therefor, said cooling being controlled to provide only sufficient condensate to maintain said reflux ratio.

7. In an apparatus for recovering valuable hydrocarbons from gases containing such hydrocarbons which includes an absorption tower, a stabilizer tower, and a still, the improvement which comprises means for introducing hydrocarbon gases and an absorbing medium into the absorption tower and for passing rich absorption oil from the absorber into the stabilizer, means for removing light vapors from the top of the stabilizer, means for passing rich absorption oil from the bottom of the stabilizer into the still, means for removing vapors from the still and for mixing lean absorption oil withdrawn from the still with the light vapors removed from the top of said stabilizer tower and for cooling the resulting mixture, and means for passing said resulting mixture into the upper part of the absorption tower as the absorbing medium to be used therein.

8. In the process of recovering desired valuable hydrocarbons from a gaseous hydrocarbon mixture containing such hydrocarbons as well as substantial proportions of lower boiling point hydrocarbons by absorbing hydrocarbons of said gaseous hydrocarbon mixture into a cooled liquid absorbing medium from which the absorbed valuable hydrocarbons are recovered by distillation, the improvement which comprises passing the resulting rich absorption medium containing the desired valuable hydrocarbons and hydrocarbons of lower boiling point from the absorption operation into a fractionating tower and therein rectifying the absorbed hydrocarbons to remove overhead the undesired lower boiling point hydrocarbons in vapor form, passing said removed lower boiling point hydrocarbon vapors into contact with a hydrocarbon absorption oil under conditions adapted to effect absorption thereof, and thereafter utilizing the resulting mixture of hydrocarbon absorption oil and absorbed lower boiling hydrocarbons as the absorbing medium in the said absorption operation for absorbing said valuable hydrocarbons.

DAVID G. BRANDT.